United States Patent [19]

Johary et al.

[11] Patent Number: 5,018,076

[45] Date of Patent: May 21, 1991

[54] METHOD AND CIRCUITRY FOR DUAL PANEL DISPLAYS

[75] Inventors: Arun Johary; Tetsuji Oguchi, both of San Jose, Calif.

[73] Assignee: Chips and Technologies, Inc., San Jose, Calif.

[21] Appl. No.: 245,862

[22] Filed: Sep. 16, 1988

[51] Int. Cl.[5] .............................................. G06F 15/62

[52] U.S. Cl. .................................... 364/518; 340/716; 340/723; 364/521

[58] Field of Search ................ 364/518, 521; 340/721, 340/723, 724, 725, 726, 709, 716, 752, 756; 358/240

[56] References Cited

U.S. PATENT DOCUMENTS

| | | | |
|---|---|---|---|
| 3,590,156 | 6/1968 | Easton | 358/240 |
| 3,845,243 | 10/1974 | Schmersal et al. | 358/240 |
| 3,863,023 | 1/1975 | Schmersal et al. | 358/240 |
| 4,121,283 | 10/1978 | Walker | 364/200 |
| 4,323,891 | 4/1982 | Akashi | 340/709 |
| 4,338,597 | 7/1982 | Steiner et al. | 340/706 |
| 4,399,435 | 8/1983 | Urabe | 340/750 |
| 4,550,386 | 10/1985 | Hirosawa et al. | 364/900 |
| 4,563,676 | 1/1986 | Leininger | 340/749 |
| 4,563,746 | 1/1986 | Yoshida et al. | 364/492 |
| 4,626,837 | 12/1986 | Priestly | 340/723 |
| 4,657,146 | 3/1987 | Lucash et al. | 340/721 |
| 4,679,043 | 7/1987 | Morokawa | 340/805 X |
| 4,684,935 | 8/1987 | Fujisaku et al. | 340/717 |
| 4,688,031 | 8/1987 | Haggerty | 340/793 |
| 4,703,318 | 10/1987 | Haggerty | 340/723 |
| 4,720,781 | 1/1988 | Crossland et al. | 364/200 |
| 4,739,313 | 4/1988 | Oudshoorn et al. | 340/703 |
| 4,742,346 | 5/1988 | Gillette et al. | 340/793 |
| 4,746,981 | 5/1988 | Nadan et al. | 358/160 |
| 4,766,427 | 8/1988 | Abe et al. | 340/724 X |
| 4,924,432 | 5/1990 | Asai et al. | 364/900 |

FOREIGN PATENT DOCUMENTS 2085257 9/1984 United Kingdom .

*Primary Examiner*—Heather R. Herndon
*Attorney, Agent, or Firm*—Townsend and Townsend

[57] ABSTRACT

A data processing system includes a video controller and a flat panel display system. The flat panel display system includes first and second flat panel displays adapted so as to appear to be essentially a single display. The video controller includes a first and second address generator for generating first and second address information and a counter for counting vertical sync position to identify alternating first and second display frames. The controller outputs the first address information to drive the first display and the second address information to drive the second display during the first display frames and outputs the second address information to drive the first display and the first address information to drive the second display during the second display frames. The displays are identical and the address generators are identical. The use of dual displays with dual, flip-flopping address generators is more advantageous than using a single address generator to drive two display panels.

24 Claims, 5 Drawing Sheets

| | F1 | F2 | F1 |
|---|---|---|---|
| ADDR GEN A | UPPER | LOWER | RESET A UPPER |
| ADDR GEN B | LOWER | RESET B UPPER | LOWER |

METHOD AND CIRCUITRY FOR DUAL PANEL DISPLAYS

The invention relates to a method and controller for driving a large size display in a data processing system. In particular, the invention employs two address generators, which each alternately drive an upper and lower display, to efficiently provide large screen display capability in a personal computing system.

BACKGROUND OF THE INVENTION

Flat panel displays in general, and liquid crystal displays in particular, are finding increasing use in data processing systems such as personal computing systems. These displays, which are driven by a video controller, provide a number of advantages over cathode ray tube type displays in terms of weight, size and compactness.

However, as is generally known, flat panel displays are chemically responsive systems, as opposed to electronically scanned systems, and thus suffer from several operational disadvantages in comparison with cathode ray tube type devices. Of particular importance, the chemical in a typical flat panel display can only maintain a visible image for a discrete time. Thus, as the size of the flat panel increases, a limiting display size is reached where an image being displayed will fade out unless it can be refreshed.

One solution to the size limitations facing flat panel displays is to use gangs of displays to provide the desired display size. For example, if the desired display area is 640×480, one solution is to use two displays of 640×240 in combination.

This use of multiple displays impacts other hardware in the data processing systems. In particular, the use of multiple panels creates a problem of how the video controller will drive the multiple displays. This problem is exacerbated when each display must have split screen display capability. The algorithms, calculations, and associated hardware adjustments required for a conventional controller to drive multiple displays with each having sophisticated display features are complicated and have not heretofore been satisfactorily resolved to applicants' knowledge.

The problems created can be more fully appreciated by reference to the following discussion taken in conjunction with FIGS. A and B. FIG. A is a stylized illustration of a memory 8 for driving a display 10 having a single panel according to the prior art. FIG. B is a stylized illustration of a memory 8 for driving a display 10 having dual panels 12 and 14 according to the prior art.

For a single panel display system such as the one shown in FIG. A, the address in memory 8 for line L on display 10, i.e., ADDR(L) is typically calculated as follows:

$$ADDR(L)=X+W^*L \text{ if } L\leqq H, \text{ and}$$

$$ADDR(L)=(L-(H+1))^*W \text{ if } L>H$$

For a display system having an associated memory as shown in FIG. 1A, the address calculations would be started for L=1 and continued until L=480. The following logical steps could be employed in a conventional method for generating the addresses:

(1) Reset: every frame.

(2) Initialize address =X.

(3) Get the next line, set L=L+1.

(4) Compare L to H.

(5) If L≦H, then add X to address.

(6) If L >H then address =0.

(7) If L =FRAME, go to step (1).

(8) Go to step (3).

A conventional address generator embodying these logic steps may be employed to drive display 10. Such an address generator could be implemented using essentially an adder and a comparator.

The situation for a dual panel display system driven by a single address generator, as illustrated in FIG. 1B, is far more complicated. In order to use the dual panels as a single screen, two lines are displayed simultaneously, which requires calculation of the start address for both lines at the same time. For example, in a 480 line display, $L_1$ and $L_2$ will both vary from 1 to 240, and $L_1$ will equal $L_2$ to maintain sync. The address for line 1, $ADDRL_1$, and the address for line 2, $ADDRL_2$ will typically be calculated as follows:

1. if $H_A<240$, & $L_1\leqq HA$, $ADDR(L_1)=X+W^* L_1$ $ADDR(L_2)=(240-HA+L_2)^*W$
2. if $H_A<240$, & $L_1>HA$, $ADDR(L_1)=[L_1--(HA+1)]^*W$ $ADDR(L_2)=[L_2--(HA+1)+240]^*W$
3. if $H_A>240$, & $L_2\leqq(H_A-240)$, $ADDR(L_1)=X+W^*L_1$ $ADDR(L_2)=X+(L_2+240)^*W$
4. if $H_A>240$, & $L_2>(H_A-240)$, $ADDR(L_1)=X+W^*L_1$ $ADDR(L_2)=[L_2--(H_A+1)]^*W+240$ It can be seen that as $L_1$ and $L_2$ vary between 1 and 240, there is no simple way to generate $ADDR(L_1)$ $ADDR(L_2)$. For example, a number of multipliers and comparators are required to implement the foregoing equations.

Prior art patents known to applicants have neither taught nor suggested any method or circuit for addressing the foregoing problems For example, U.S. Pat. No. 4,684,935 to Fujisaku, et al., discloses the use of dual memories for storing first (graphics) images and second (characters) images. A selection and combination circuit is used to display at either or both of two display units a combination of data from the image memories according to the display request The combination and selection circuits comprise signal mixing circuits. As another example, U.S. Pat. No. 4,651,146 to Lucaste et al., discloses the use of a multiple window display system for displaying data from different applications in a multi-tasking environment. U.S. Pat. No. 4,323,891 to Akashi describes a method and system for producing a cursor display signal in which display information is supplied to stations by using a mirror reflection. One cursor address is outputted while the cursor address for a divided screen is stored in a register in the controller.

SUMMARY OF THE INVENTION

The invention is a video controller that is useful in a data processing system to drive a large flat panel display. The flat panel display includes first and second flat panel displays disposed adjacent to each other so as to appear to be essentially a single display. The video controller includes a first and second address generator for generating first and second address information to drive the first and second displays. The controller counts the vertical sync position in the display system to identify display frames. The controller outputs the first address information to drive the first display and the second address information to drive the second display during a first display frame. Subsequently, the controller outputs the second address information to drive the first display and the first address information to drive the second display during a succeeding display frame. The address generators repeat this alternating display drive process during subsequent frames.

In one embodiment, the displays are substantially identical which result in each address generator starting to drive the other display just as the end of the current display is reached.

In another embodiment, the address generators are also substantially identical.

The use of substantially identical and conventional displays and address generators permits the attainment of big screen display features without requiring the proliferation and development of additional controller and display hardware.

Additional objects, features and advantages of the present invention will be understood by those of ordinary skill in the art by referring to the following detailed description of the invention, the drawings, and the appended claims.

DETAILED DESCRIPTION OF THE INVENTION

In summary, the invention uses two address generators that alternately drive an upper and lower display over repeating frames. By using multiple address generators, the need for a complicated, single address generator that can simultaneously drive a number of displays and that has split screen capability is eliminated. The invention will first be explained by reference to circuit diagrams for a data processing system and a controller according to the invention by reference to FIGS. 2 and 3. The invention will next be explained by reference to a method for driving upper and lower displays using two address generators by reference to FIGS. 4A–B and 5.

Figure 1A:
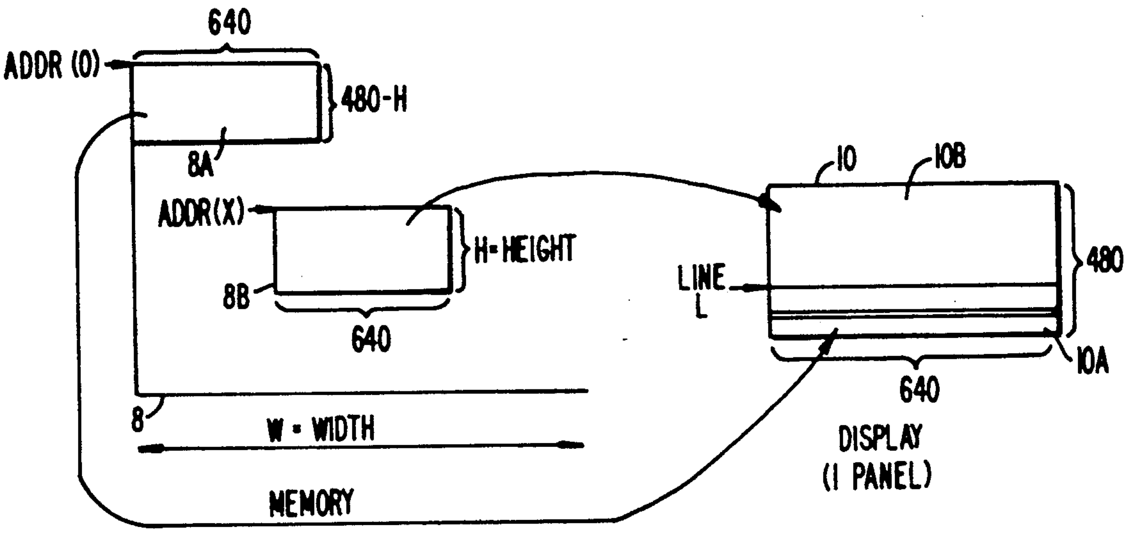
FIG. 1A. (PRIOR ART)
FIGS. 1A and 1B are stylized illustrations of display systems according to the prior art.
Figure 1B:
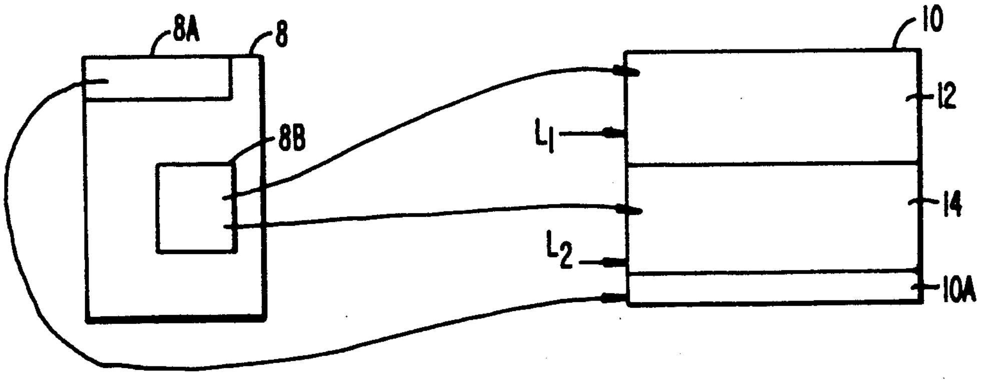
FIG. 1B. (PRIOR ART)
Figure 2:
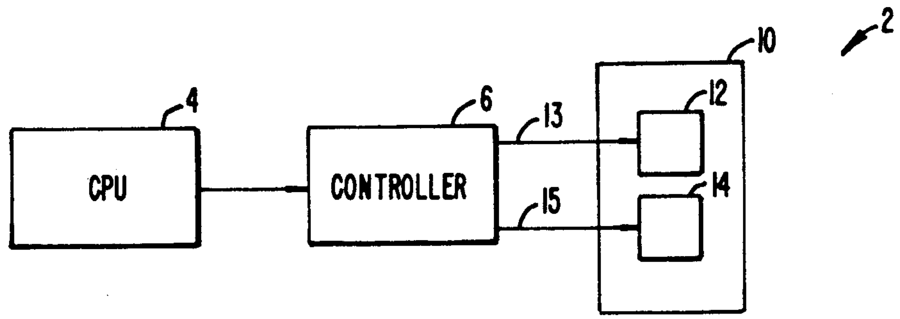
FIG. 2 is a block diagram of a data processing system according to the invention.

FIG. 2 shows a data processing system 2 according to one embodiment of the invention. Data processing system 2 includes a central processing unit 4, a controller 6, a memory 8, and a display system 10. Central processing unit 4, controller 6, and memory 8 interact as in conventional personal computing systems that include a display.

Display system 10 is a large size flat panel display that consists of an upper display unit 12 and a lower display unit 14. Display unit 12 and display unit 14 are placed in close proximity and adapted such that in appearance display units 12 and 14 appear to be a single display device. Upper display 12 is driven by controller 6 over a video output line 13. Lower display 14 is driven by controller 6 over a video output line 15.

Figure 3:
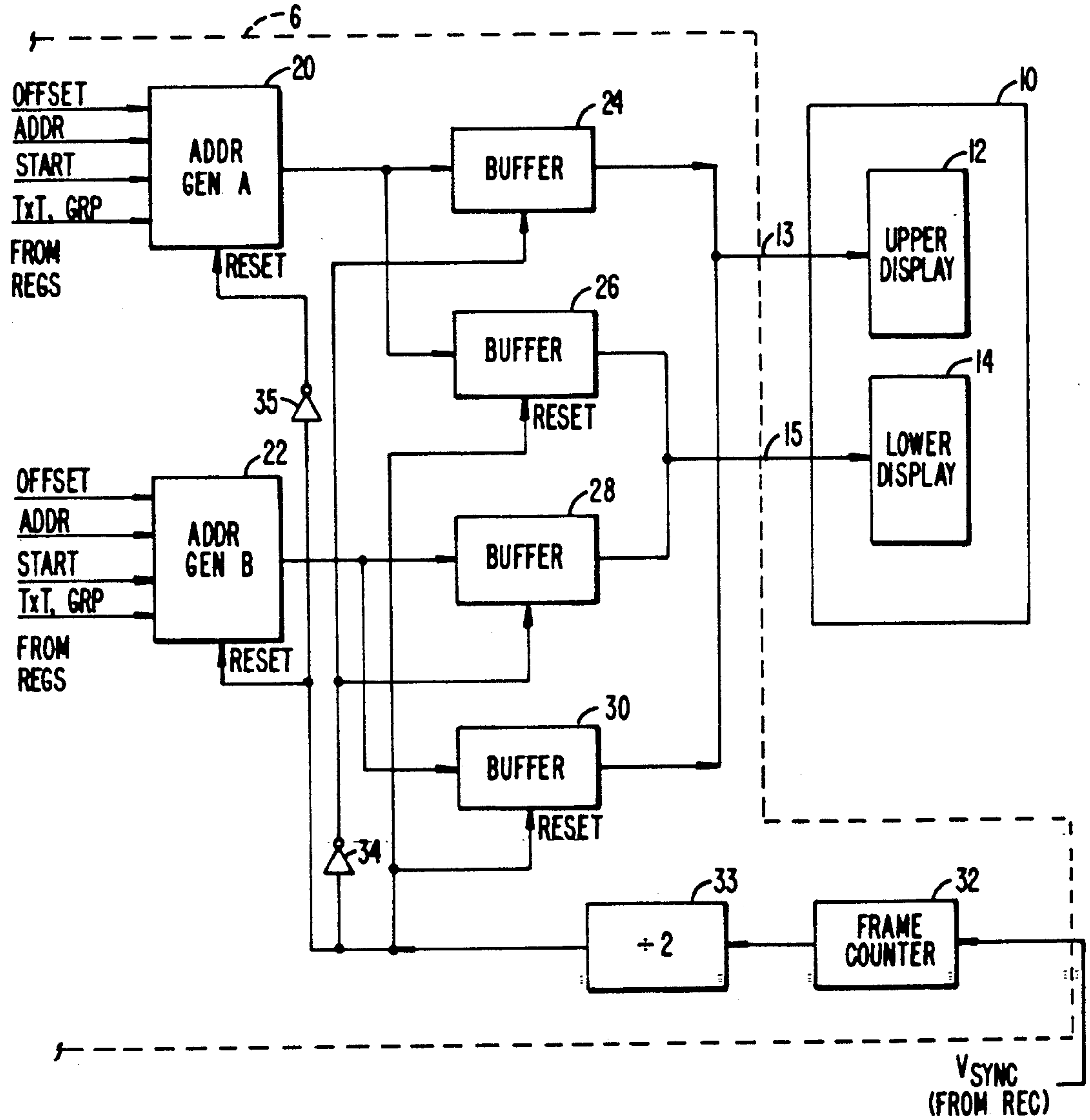
FIG. 3 is a block diagram of a controller and display system according to the invention.

FIG. 3 is a more detailed diagram showing an address generation portion of controller 6 in communication with upper display 12 and lower display 14 of display system 10. The address generating portion of controller 6 according to the invention includes first and second address generators 20 and 22 for this embodiment. Both address generators receive offset, start, text/graphics, address and other information from registers within controller 6. Address generator 20 and address generator 22 may each be a conventional address generator for driving a split screen display. Address generator 20 outputs address information to drive upper display 12 and lower display 14. Likewise, address generator 22 outputs address information to drive upper display 12 and lower display 14 in a one frame lag relationship with address generator 20, as will be explained in further detail below.

The address information from address generator 20 (first address information) is provided to an input of a buffer circuit 24 and an input of a buffer circuit 26. The output of buffer circuit 24 is coupled to video output bus 13 which drives upper display 12. Video information output from buffer circuit 26 is coupled to video output bus 15 for driving lower display 14. The output of address generator 22 (second address information) is provided to an input of a buffer circuit 28 and an input of buffer circuit 30. The output of buffer circuit 28 is provided to video output bus 15 to drive lower display 14. The output of buffer circuit 30 is provided to video output bus 13 to drive upper display 12.

Buffer circuits 24, 26, 28 and 30 may be conventional buffer circuits. These buffer circuits receive address information as input and generate video control output information as in conventional buffer circuits operating in conjunction with the conventional address generator within a video controller.

According to the invention, address generator 20 and address generator 22 are alternately used to drive upper display 12 and lower display 14. This is accomplished for the embodiment shown in FIG. 3 through the use of signals which reset address generators 20 and 22 and buffer circuits 24, 26, 28 and 30. For the embodiment shown in FIG. 3, this reset is accomplished by providing a frame counter circuit 32. Counter circuit 32 receives a V sync signal from conventional sync generating hardware within controller 6. Frame counter circuit 32 generates an output after a predetermined number of vertical line changes that equals to a frame. This number of vertical lines will usually correspond to the number of lines in the upper display 12 and the lower display 14 (assuming both are identical). Frame counter 32 outputs frame count information. This frame count information is provided as input to a "divide-by-two" circuit 33 which provides frame information as output every other frame.

The frame information generated every other frame by divide by two circuit 33 is used to reset address generators 20 and 22 and the buffers 24, 26, 28 and 30. The output from divide by two circuit 33 is provided to a reset input to buffer circuit 26 and buffer circuit 30. The output from divide-by-two circuit 33 is also provided to an inverter 34. The output of inverter 34 is provided to a reset input to buffer circuit 24 and buffer circuit 28. The output of inverter 34 is also provided to a reset input to address generator 22 and to an inverter 35. The output of inverter 35 is provided to a reset input to address generator 20.

Through the use of the divide-by-two circuit 33 and the use of inverter 34, buffer 24 will drive upper display 12 and buffer 28 will drive lower display 14 during the same frame while buffer circuit 26 will drive lower display 14 and buffer circuit 30 will drive buffer display 12 during a succeeding display frame.

Address generator 20 will be reset to a mutual address position (0,0) in a first frame when buffer circuit 24 is reset to again drive upper display 12. Likewise, address generator 22 will be reset to address (0,0) in a succeeding frame when buffer circuit again drives upper display 12.

Figure 6:
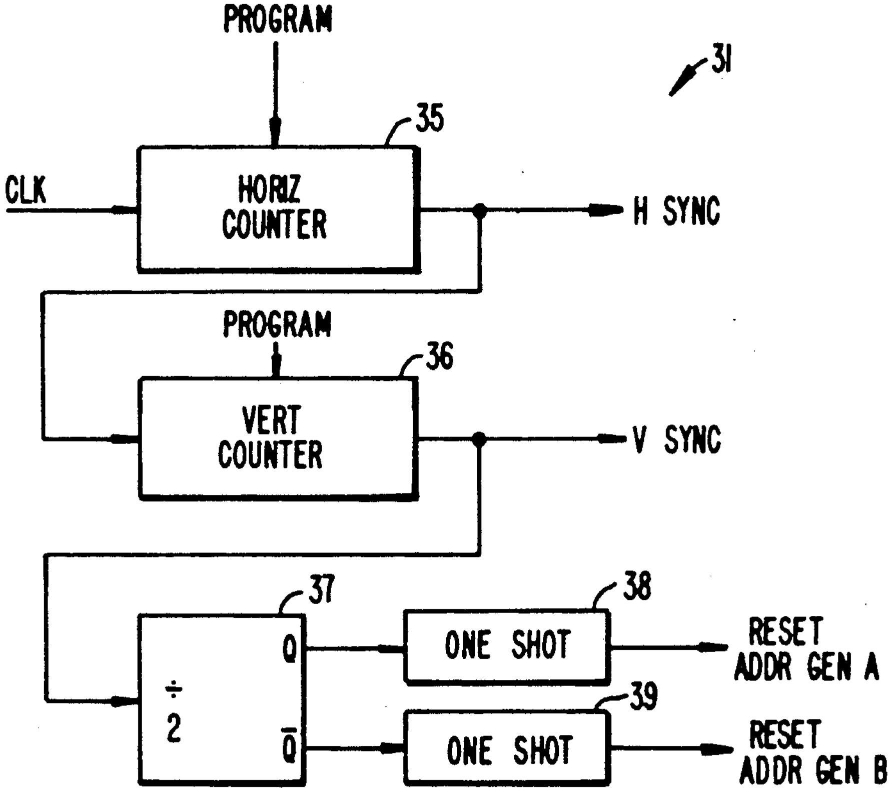
FIG. 6 is a frame counter circuit useful in one embodiment of the invention.

An alternate circuit 31 for generating reset information is shown in FIG. 6. This circuit receives clock information and uses counters 35 and 36 to generate horizontal and vertical sync information. The vertical sync information is provided to divide-by-two circuit 37 and one-shot leading edge detection circuits 38 and 39, in order to generate reset information.

Figure 4A:
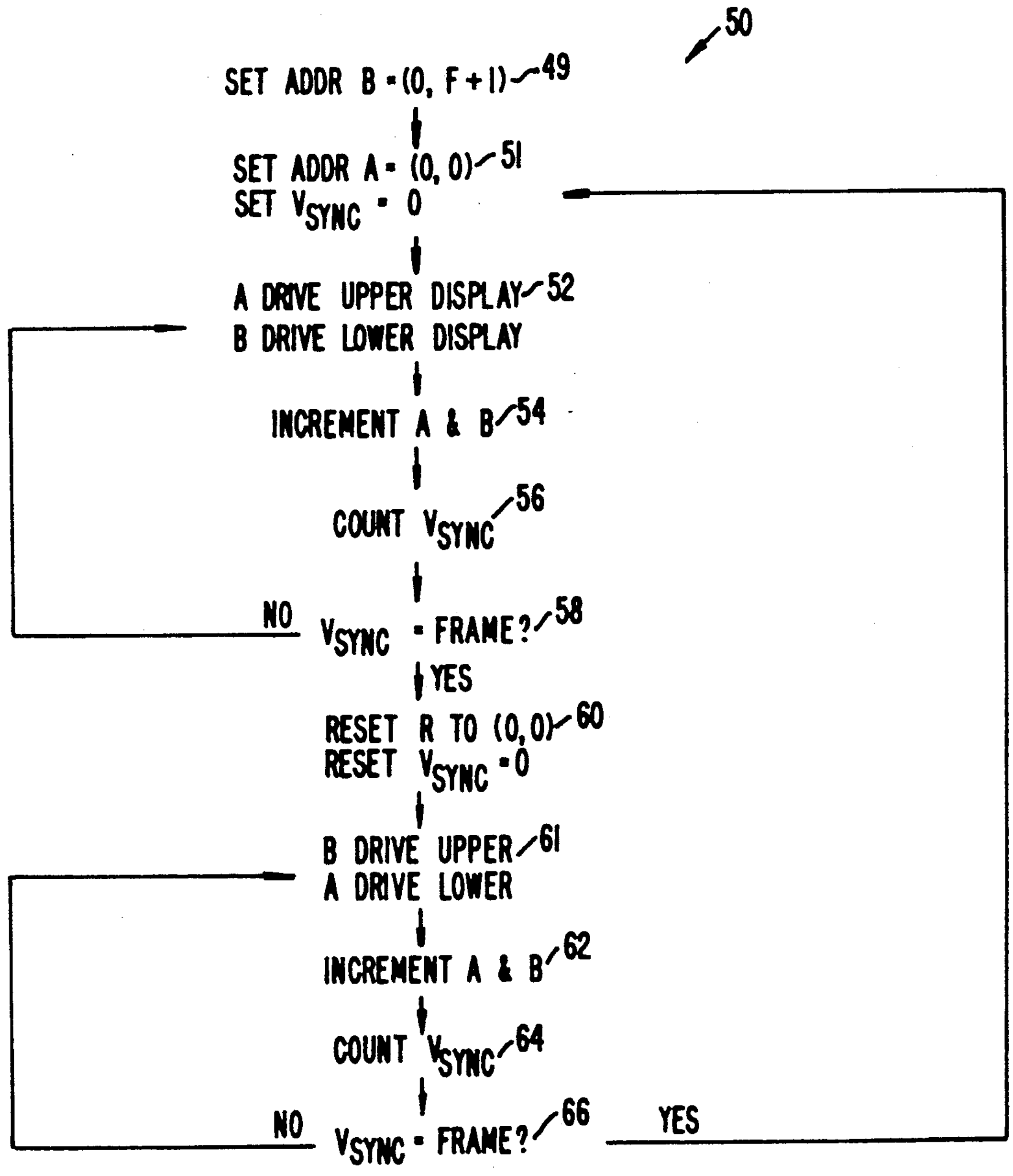
FIGS. 4A and 4B are methods for driving dual panels according to embodiments of the invention.

Refer now to FIG. 4A which is a flow diagram of a method 50 for controlling a dual panel display device according to the invention. For the purposes of discussing method 50, address generator A refers to the address generator which initially drives the upper display and address generator B refers to the address generator which initially drives the lower display. In the initial step 51, address generator A is set to an initialized address for position (0,0) and address generator B is set to an initial address of (0, F+1). F represents the number of vertical lines in the upper display so that F +1 represents the first line in the lower display. Thus, address generator B is initially set to the topmost left position in the lower display.

In step 52, address generator A is used to drive the upper display and address generator B is used to drive the lower display. At step 54, the addresses for address generators A and B are incremented as during the operation of a conventional address generator. At step 56, the vertical lines are counted using the V sync signal to keep track of the position of the display with reference to the end of the upper and lower displays. At step 58, a determination is made whether the vertical lines (or V sync) indicate the end of a frame, i.e., the end of the vertical lines in upper display 12 and lower display 14 (assuming the two displays are identical). If there is no end of frame, then the incremented A address is used to drive the upper panel and the incremented B address is used to drive the lower panel. The addresses from address generators A and B are thus continuously incremented to drive the upper and lower panels until an end of frame condition is indicated. When an end of frame condition is indicated, then the address generator B is reset to address for position (0,0) in step 60. The address for address generator A meanwhile will naturally transition to the next line which will be the first line in the lower display device. Thus, address generator B will drive the upper display and address generator A will naturally drive the lower display. It can be seen that the lower display should correspond to addresses starting not at (0,0), but at (0, F+1).

In step 62, the addresses in address generators A and B are incremented as during a conventional operation and the vertical sync or vertical lines are counted in step 64. So long as the vertical sync count does not indicate an end of frame condition, the address information from address generators A and B are incremented as normal such that address generator B drives vertically through the upper display while address generator A drives vertically through the lower display. When the vertical count indicates an end of frame at step 66, address generator A is reset to (0,0) which causes address generator A to drive the upper display (0, F+1). Address generator B will naturally proceed to the next vertical line which will be the first position in the lower display. Thus, address generator B will naturally drive the lower display when address generator A is reset to drive the upper display.

It can be seen that this process will repeat itself such that one of address generators A and B will drive the upper display while the other of address generators A and B will drive the lower display. FIG. 4 is a chart which summarizes the cyclical nature of this process.

Figures 4B, 5:
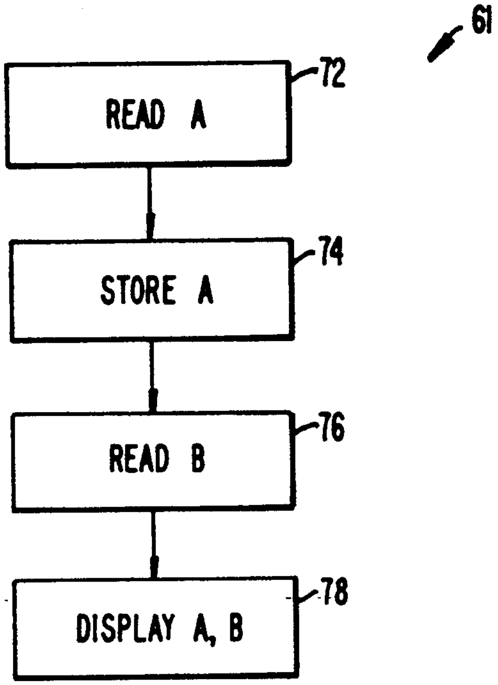
FIG. 5 is a chart that illustrates the displays driven by each address generator during frames over time.

Refer now to FIG. 4B, which is a logic flow diagram showing how address information from address generators A and B is used to drive the upper and lower displays As shown in FIG. 4B, this process includes the steps of reading address generator A, storing the from address formation generator A, reading address generator B, and subsequently displaying the information fetched from memory locations corresponding to address information A and B.

It can be seen that in operation two address generators are used together to each drive a panel in a dual panel system, one frame out of phase. Since each address generator accesses a different area of memory because of this out-of-phase relationship, each has access to the memory at the same time. One address generator controls the upper display in one frame while the other controls the lower display in the next frame. Typically, a conventional address generator can drive a 640×240 display in about 20 milliseconds. Thus, it would take a conventional address generator approximately 40 milliseconds to cover a 640×480 screen not counting time loss for calculations, etc. According to the invention, two address generators are used simultaneously to drive the upper and lower screens simultaneously. Thus, although it would take either address generator alone 40 milliseconds to drive the entire screen, by using the two address generators, the screen can be drawn in only 20 milliseconds. This provides the effect of a conventional address generator running at twice its rated speed.

It can also be seen that where the upper panels and lower panels are substantially identical, the next address after an end of frame will naturally be the first address in the next panel. Thus, the address generators naturally switch to drive one screen and then the other without the necessity of using complicated algorithms or calculations.

Although the invention has been explained with reference to the foregoing embodiments, it should be apparent to one skilled in the art that numerous changes and modifications may be made thereto without departing from the scope or spirit of the invention For example, although the displays have been shown as abutting each other vertically, it should be apparent that the displays can be configured to abut horizontally without departing from the scope or spirit of the invention. In addition, although the frame count information has been used to reset buffers to switch the address generators between the upper and lower displays, it is also possible to use select circuits which switch between the two sets of address information as output in response to the frame identifying information. Moreover, although the invention has been explained as a means for simplifying the control a dual panel display, the invention may also be used to more quickly drive a single display by using a plurality of address generators. As a simple example, a display may be divided into an upper and lower section which sections may be alternately driven by two address generators as disclosed herein. Such a configuration would permit doubling of the speed of displaying information in the display system.

Other changes, modifications and applications of the invention will become apparent to one skilled in the art in view therefore of this disclosure. Thus, the invention should be limited only in accordance with the appended claims.

What is claimed is:

1. A data processing system comprising:
   - a flat panel display system, including first and second flat panel displays adapted so as to appear to be essentially a single display; and
   - a video controller including
   - first and second address generators for generating first and second address information to drive said first and second displays,
   - means for counting vertical sync position to identify first and second display frames,
   - means for providing said first address information to drive said first display and said second address information to drive said second display during first display frames, and
   - means for providing said second address information to drive said first display and said first address information to drive said second display during second display frames.

2. The data processing system of claim 1 and wherein said displays are substantially identical.

3. The data processing system of claim 1 and wherein the vertical sync count for determining a frame is determined by the size of said displays.

4. The data processing system of claim 1 and wherein said controller provides split screen capability for each display.

5. The data processing system of claim 1 and wherein said displays are liquid crystal displays.

6. The data processing system of claim 1 and wherein said first and second address generators are substantially identical.

7. A video controller for use in a data processing system, said processing system having a flat panel display system, said flat panel display system including first and second flat panel displays adapted so as to appear to be essentially a single display, said video controller comprising:
   - first and second address generators for generating first and second address information to drive said first and second displays;
   - means for counting vertical sync position to alternately identify first and second display frames;
   - means for providing said first address information to drive said first display and said second address information to drive said second display during said first display frames; and
   - means for providing said second address information to drive said first display and said first address information to drive said second display during second display frames.

8. The controller of claim 7 and wherein said displays are substantially identical.

9. The controller of claim 7 and wherein the vertical sync count for determining a frame is determined by the size of said displays.

10. The controller of claim 7 and further comprising for providing split screen capability for each display.

11. The controller of claim 7 and wherein said displays are liquid crystal displays.

12. The controller of claim 7 and wherein said address generators are substantially identical.

13. A video controller for use in a data processing system having a flat panel display system, said flat panel display system including N flat panel displays adapted so as to appear to be essentially a single display, said video controller comprising:
   - N address generators for generating N sets of address information to drive said N displays,
   - means for counting vertical sync position to identify display frames; and
   - means responsive to said frame identification information for selectively driving said N displays using either of said N sets of address information.

14. The controller of claim 13 and wherein said displays are substantially identical.

15. The controller of claim 13 and wherein the vertical sync count for determining a frame is determined by the size of said displays.

16. The controller of claim 13 and further comprising means for providing split screen capability for each display.

17. The controller of claim 13 and wherein said displays are liquid crystal displays.

18. The controller of claim 13 and wherein said address generators are substantially identical.

19. In the operation of a video controller for a data processing system having a dual panel display, a method of generating address information including the steps of:
   - generating first and second address information;
   - counting vertical sync information to identify first and second display frames;
   - providing said first address information to drive said first display and said second address information to drive said second display during first display frames; and
   - providing said second address information to drive said first display and said first address information to drive said second display during second display frames.

20. The method of claim 19 and wherein said displays are substantially identical.

21. The method of claim 19 and wherein the vertical sync count for determining a frame is determined by the size of said displays.

22. The method of claim 19 and wherein said controller operates to provide split screen capability for each display.

23. The method of claim 19 and wherein said displays are liquid crystal displays.

24. The method of claim 1 and wherein said address generators are substantially identical.

* * * * *

UNITED STATES PATENT AND TRADEMARK OFFICE
CERTIFICATE OF CORRECTION

PATENT NO. : 5,018,076

DATED : May 21, 1991

INVENTOR(S) : Arun Johary and Tetsuji Oguchi

It is certified that error appears in the above-identified patent and that said Letters Patent is hereby corrected as shown below:

On the Title page, change name of assignee "Chips and Technologies, Inc., San Jose, Calif." to --Chips and Technologies, Inc., San Jose, Calif., and ASCII Corporation, Tokyo, Japan--.

Signed and Sealed this

Twenty-ninth Day of December, 1992

*Attest:*

DOUGLAS B. COMER

*Attesting Officer*

*Acting Commissioner of Patents and Trademarks*